(12) United States Patent
Dai et al.

(10) Patent No.: US 12,538,311 B2
(45) Date of Patent: Jan. 27, 2026

(54) SYSTEM AND METHOD FOR TRANSMISSION INDICATIONS

(71) Applicant: ZTE CORPORATION, Guangdong (CN)

(72) Inventors: Jianqiang Dai, Shenzhen (CN); Wei Cao, Shenzhen (CN); Jianwu Dou, Shenzhen (CN); Nan Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 490 days.

(21) Appl. No.: 18/090,844

(22) Filed: Dec. 29, 2022

(65) Prior Publication Data

US 2023/0140371 A1 May 4, 2023

Related U.S. Application Data

(63) Continuation of application No. PCT/CN2020/100779, filed on Jul. 8, 2020.

(51) Int. Cl.
*H04W 72/20* (2023.01)
*H04L 1/08* (2006.01)
*H04W 72/12* (2023.01)

(52) U.S. Cl.
CPC .............. *H04W 72/20* (2023.01); *H04L 1/08* (2013.01); *H04W 72/12* (2013.01)

(58) Field of Classification Search
CPC . H04W 72/20; H04W 72/12; H04W 56/0015; H04L 1/08; H04L 1/189; H04L 1/1893; H04L 1/1896; H04B 7/1851; H04B 7/18504
See application file for complete search history.

(56) References Cited

U.S. PATENT DOCUMENTS

| | | | |
|---|---|---|---|
| 2007/0030838 A1 | 2/2007 | Kaikkonen et al. | |
| 2018/0048444 A1* | 2/2018 | Park | H04L 5/0048 |
| 2019/0159232 A1 | 5/2019 | Nader et al. | |
| 2020/0367270 A1* | 11/2020 | Nader | H04W 72/1273 |
| 2022/0287053 A1* | 9/2022 | Beale | H04W 28/18 |
| 2023/0113042 A1* | 4/2023 | Liberg | H04W 56/0045 |
| | | | 455/427 |
| 2024/0057002 A1* | 2/2024 | Sun | H04W 72/232 |

FOREIGN PATENT DOCUMENTS

| | | |
|---|---|---|
| CN | 108605342 A | 9/2018 |
| CN | 111132338 A | 5/2020 |
| WO | WO-2017/160351 A1 | 9/2017 |

OTHER PUBLICATIONS

International Search Report and Written Opinion for PCT Appl. No. PCT/CN2020/100779, dated Apr. 16, 2021 (9 pages).

LG Electronics: "Discussion on multiple transport blocks scheduling in NB-IoT" 3GPP TSG RAN WG1 Meeting #94bis; R1-1810242; Oct. 12, 2018; Chengdu, China (5 pages).

(Continued)

*Primary Examiner* — Habte Mered
(74) *Attorney, Agent, or Firm* — Foley & Lardner LLP (57) ABSTRACT

A system and method for transmission indications are disclosed herein. In one embodiment, the system and method are configured to transmit, by a wireless communication node to a wireless communication device, within an uplink gap or a downlink gap, control information.

19 Claims, 8 Drawing Sheets

(56) References Cited

OTHER PUBLICATIONS

Sony: "Transmission in preconfigured UL resources" 3GPP TSG RAN WG1 Meeting #94; R1-1808348; Aug. 24, 2018; Gothenburg, Sweden (4 Pages).
First Office Action for CN Appl. No. 202080102766.4, dated Sep. 14, 2024 (with English translation, 24 pages).
Sony, "Early termination of uplink repetitions in HD-FDD", 3GPP TSG RAN WG1 Meeting #88bis, R1-1705201, Apr. 7, 2017, Spokane, USA (3 pages).
Extended European Search Report on EP Appl No. 20944144.3, dated Jun. 28, 2023 (8 pages).

* cited by examiner

A wireless node transmits control information within an uplink or a downlink gap to a wireless device
501

A wireless device transmits control information within an uplink or a downlink gap to a wireless node 1201

Figure 12

SYSTEM AND METHOD FOR TRANSMISSION INDICATIONS

CROSS-REFERENCE TO RELATED APPLICATION

This application claims the benefit of priority under 35 U.S.C. § 120 as a continuation of PCT Patent Application No. PCT/CN2020/100779, filed on Jul. 8, 2020, the disclosure of which is incorporated herein by reference in its entirety.

TECHNICAL FIELD

The disclosure relates generally to wireless communications and, more particularly, to systems and methods for transmission indications.

BACKGROUND

In areas where there is weak terrestrial network service or no terrestrial network service, a non-terrestrial network ("NTN") network may be employed to support connectivity of massive Internet of Things ("IoT") devices. NTNs such as Geostationary Earth Orbit ("GEO") satellites or Low Earth Orbit ("LEO") satellites can provide continental local or regional services. However, special considerations must be made when using NTN networks.

The fast movement of satellites relative to a user's position on earth can lead to Doppler frequency shifting. Further, the distance of a satellite from terrestrial wireless communication devices can result in large transmission round trip times. Thus, the transmissions between satellites and a user may be very lengthy because generally, data in the transmission may be repeated.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one embodiment, a method performed by a wireless communication node includes transmitting, by a wireless communication node to a wireless communication device, within an uplink gap or a downlink gap, control information.

In another embodiment, a method performed by a wireless communication device includes receiving, by a wireless communication device from a wireless communication node, within an uplink gap or a downlink gap, control information.

In yet another embodiment, a method performed by a wireless communication device includes, transmitting by a wireless communication device to a wireless communication node, within an uplink gap or a downlink gap, control information.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION OF EXAMPLE EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

1. Mobile Communication Technology and Environment

Figure 1:
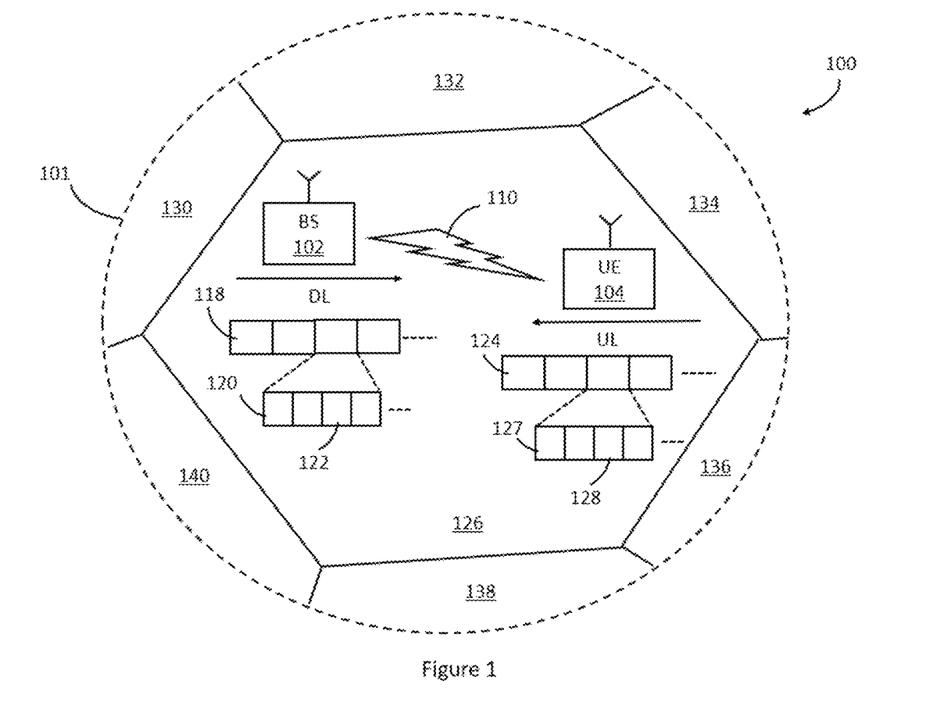
FIG. 1 illustrates an example cellular communication network in which techniques and other aspects disclosed herein may be implemented, in accordance with some embodiments of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102") and a user equipment device 104 (hereinafter "UE 104") that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
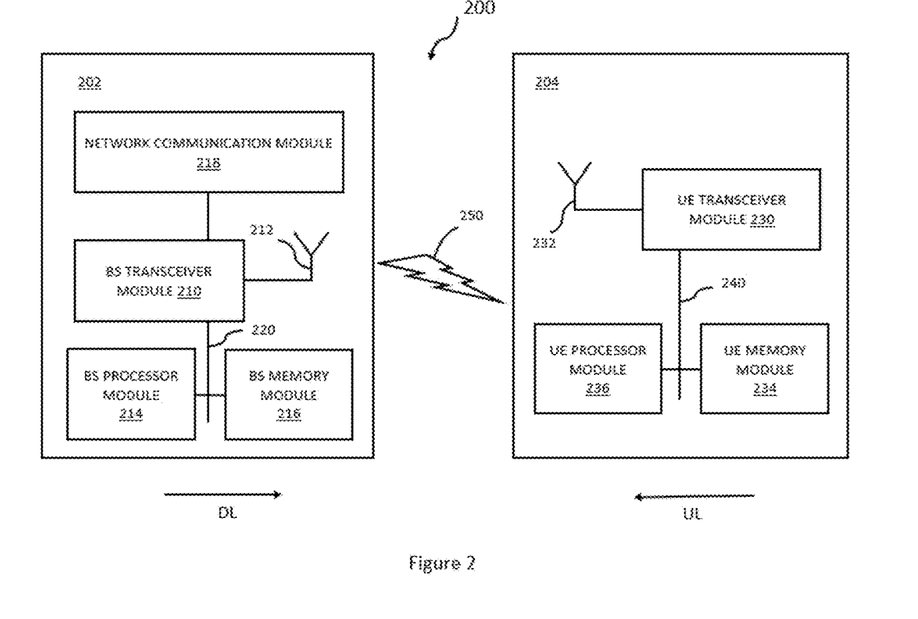
FIG. 2 illustrates block diagrams of an example base station and a user equipment device, in accordance with some embodiments of the present disclosure.

FIG. 2 illustrates a block diagram of an example wireless communication system 200 for transmitting and receiving wireless communication signals, e.g., half-duplexing signals, in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

When devices communicate via half-duplex ("HD"), devices may not transmit and receive simultaneously. In other words, a UE can not process UL transmission and DL transmission at the same time. Thus, there is an asymmetric flow for UL and DL data transmission. Examples of these devices may include low-cost narrow band devices that connect to the internet, in other words, narrow band Internet of Things devices ("NB-IoT") such as sensors and industrial devices. In frequency-division duplexing ("FDD"), separate frequency bands may be employed to transmit UL and DL information. In time-division duplexing ("TDD"), a single frequency band may be employed for UL and DL information, but the transmissions are scheduled to occur during different time slots.

Figure 3:
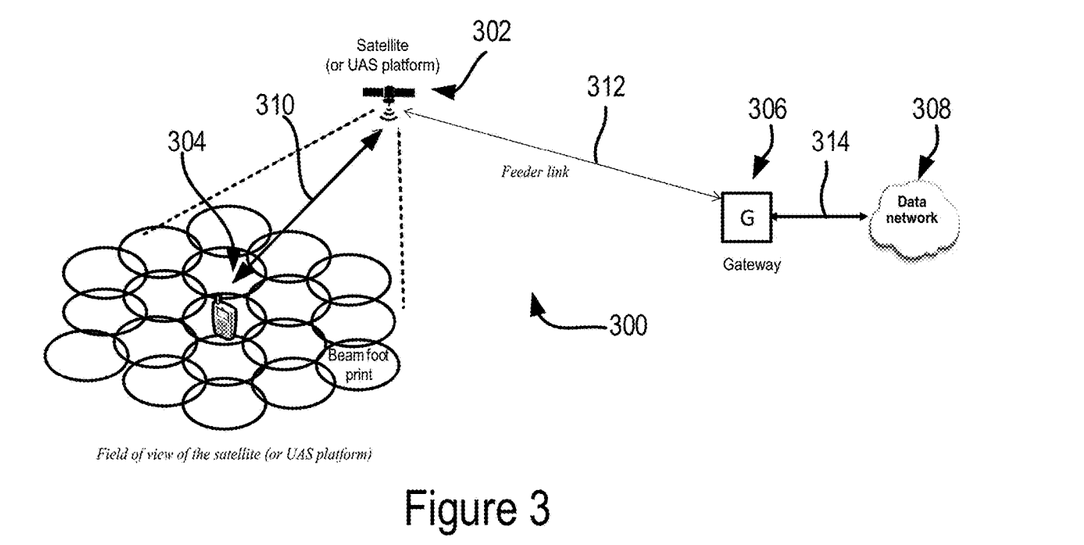
FIG. 3 shows a block diagram of an example non-terrestrial communication network, in accordance with some embodiments of the present disclosure.

FIG. 3 shows a block diagram of an example non-terrestrial communication network 300 including at least one unmanned aerial system based wireless communication nodes. In particular, FIG. 3 shows a communication network 300 including a satellite or an unmanned aerial vehicle (UAV) 302, UE 304, a gateway 306 and a data network 308. The satellite 302 can serve as a platform for a base station, such as, for example, the BS 102 and 202 discussed above in relation to FIGS. 1 and 2, and the UE 304 can be similar to the UE 104 and 204 discussed above in relation to FIGS. 1 and 2. The UE 304 and the BS on the satellite 302 can communicate over a communication link 310, and the BS on the satellite 302 and the gateway 306 can communicate over a feeder link 312. The gateway 306 can communicate with the data network 308 over a data link 314.

Figure 4:
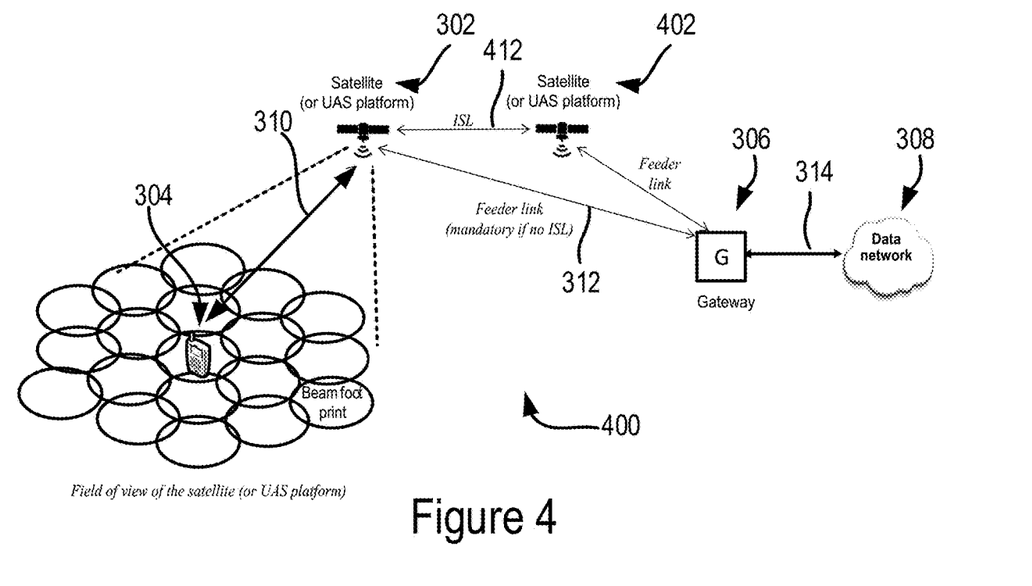
FIG. 4 shows a block diagram of an example non-terrestrial communication network, in accordance with some embodiments of the present disclosure.

FIG. 4 shows another example non-terrestrial communication network 400 including at least one unmanned aerial system based wireless communication nodes. The communication network 400 shown in FIG. 4 is similar to the communication network 300 shown in FIG. 3, but include an additional satellite or UAV platform 402. FIG. 4 depicts the scenario where the communication network includes a constellation of satellites that allow communication between the UE and the gateway or data network.

The gateway can be one of several gateways that can provide connectivity between satellite 302/402 and the data network 308, which can be a public terrestrial data network. The gateways can be deployed across the satellite's targeted coverage area, which can include regional or continental coverage area. In examples where the satellite is a non-geostationary earth orbit satellite ("non-GEO satellite"), the satellite can be served successively by one or several gateways at a time. The communication network can ensure that there is the service link and the feeder link continuity is maintained between successive gateways with sufficient time duration to proceed with mobility anchoring and handover. In some examples, the UE in a cell may be served by only one gateway.

The satellite can implement either a transparent or a regenerative (with on-board processing) payload. The satellite can generate several beams over a service area that can be bounded by its field of view, which can depend on the on-board antenna characteristics and a minimum elevation angle of the satellite. The footprints of the beams on the surface of the earth can be elliptical in shape. In instances where the satellite implements transparent payload, the satellite may carry out radio filtering, frequency conversion, and amplification, thereby repeating the signals. In instances where the satellite platform implements regenerative payload, the satellite can carry out radio frequency filtering, frequency conversion, amplification, as well as demodulation/modulation, switching and/or routing, coding/modulation, etc., effectively carrying out functions, at least in part, of a base station on-board the satellite.

In instances where the communication system includes a constellation of satellites, such as for example, the communication system shown in FIG. 4, the network can include an inter-satellite link ("ISL") 412. In some such instances, the satellites can implement regenerative payload. The ISL can may operate in RF or in optical frequency bands.

Table 1 below lists various types of satellites that can be used to implement the satellite/UAV 302 and 402 shown in FIGS. 3 and 4. The types of satellites and the corresponding information shown in Table 1 are only examples and are not limiting, as other types of platforms and satellites can also be utilized.

TABLE 1

| Platforms | Altitude range | Orbit | Typical beam footprint size |
|---|---|---|---|
| Low-Earth Orbit (LEO) satellite | 300-1500 km | Circular around the earth | 100-500 km |
| Medium-Earth Orbit (MEO) satellite | 7000-25000 km | | 100-500 km |
| Geostationary Earth Orbit (GEO) satellite | 35 786 km | notional station keeping position fixed in terms of elevation/azimuth with respect to a given earth point | 200-1000 km |
| UAS platform (including HAPS) | 8-50 km (20 km for HAPS) | | 5-200 km |
| High Elliptical Orbit (HEO) satellite | 400-50000 km | Elliptical around the earth | 200-1000 km |

In some embodiments, GEO satellite and UAS platforms can be used to provide continental, regional, or local service. In some embodiments, a constellation of LEO and MEO satellites can be used to provide services in both northern and southern hemispheres. In some instances, constellation of satellites can even provide global coverage including the polar regions. In some such instances, appropriate orbit inclination, ISLs and beams can be selected.

2. Base Station Transmits Control Information

DL and UL transmission between satellites and users can be very lengthy because there may be a need to repeat the transmission various times. Thus, there may be a schedule of repeated transmissions such that the same transmission is repeated n times. The schedule of repeated transmissions may increase the performance of the receiver. In some embodiments, a BS may transmit control information such that the repeated transmission schedule may be adjusted. In other words, the configuration of the repeated transmission schedule may be adjusted. The control information may include at least one of broadcasting information, synchronization information, or a reference signal ("RS"). In some embodiments, repeated transmission schedules may be adjusted by control information where the control information includes beam switching information, a number of missed repeated transmissions, or termination information. In some embodiments, the BS may process the control information. Alternatively, the BS may process the repeated transmission information. The BS may process the control information and/or the repeated transmission information by scrambling, modulating, and/or resource mapping the information before it is transmitted.

In some embodiments, a transmission may not completely end in one service beam because of the BS's movement and long propagation delays. The propagation delay may be the time associated with the transmission of one signal by a BS and the reception of that signal at a UE. Subsequently, a BS may determine to continue the transmission via a different service beam. In other words, the BS may determine to switch from a first resource to a second, different resource. For example, a resource may be associated with a beam. In other words, in response to a UE moving out of a first beam coverage, a BS may indicate beam switching should occur and a second beam may be employed for a next repeated transmission. Alternatively, a BS may indicate beam switching should occur in response to the receiver power of a UL signal in a first beam being smaller than the receiver power of UL signal in a second beam. In other words, the transmitting beam may switch from a first resource to a second, different resource. In some embodiments, the information indicating that the beam may be switched may be transmitted in the form of a 1 bit flag in a control field in the transmitted signal. In other embodiments, the information indicating that the beam may be switched may be transmitted by indicating a second beam to switch to.

In some embodiments, in response to the beam switch, partial repeated data may not be successfully received. For example, PUSCH may be missed. In other words, when the BS determines to switch beams, data may not successfully be received at the BS. In some embodiments, the number of repetitions missed by the BS may be 2', where n may be based on the switch time, round-trip time, and the numerology, for example, of a PUSCH transmission. In one example, a subcarrier space may be 3.75 kHz and the duration of a PUSCH transmission may be 32 ms. When the subcarrier space is 15 kHz, the duration of a PUSCH transmission may be 1 ms, 2 ms, 4 ms or 8 ms. Thus, in addition to indicating the beam switching information, the BS may indicate a number of missed PUSCH transmissions.

In some embodiments, in response to the BS successfully decoding the transmitted data, the subsequent repeated transmissions may not be necessary. For example, a transmission may be scheduled to repeat n times. In response to the BS successfully decoding PUSCH, PRACH and/or PUCCH in x transmissions, where x<n, the remaining n–x transmissions may not be transmitted. In other words, the BS may signal to the UE via termination information that the UE may stop transmitting a portion of the scheduled repeated transmissions. For example, the UE may stop current transmission and subsequent repeated transmissions, and the current schedule/transmission may come to an end. Subsequently, the UE may be scheduled via other DL control information or high layer signaling. In another example, the UE may stop transmitting the remaining transmissions. The BS may signal the termination information to improve system efficiency and reduce power consumption. In some embodiments, the termination information may be transmitted in the form of a 1 bit flag in a control field of the transmitted signal.

To compensate for Doppler frequency offsets and propagation delay offsets based on the distance of a UE from a BS and the speed at which the BS may be moving, a UE may insert a UL gap or DL gap between UL or DL transmissions. During the gap, the timing and/or frequency re-synchronization may occur between the UE and the BS. The UL and/or DL gap may be called a compensation gap.

In some embodiments, the compensation gap may be inserted at the end of a maximum continuous UL transmission. In other embodiments, the compensation gap may occur after Physical Random Access Channel ("PRACH") transmission, Physical Uplink Shared Channel ("PUSCH") transmissions, and Physical Uplink Control Channel ("PUCCH") transmission. The gap may be inserted and/or interrupt a transmission periodically. For example, the gap may be inserted every 256 ms. In some embodiments, the gap may be 40 ms long. In some embodiments, when the compensation gap is inserted after a DL transmissions, the period of the DL compensation gap for a first UE may need to consider the schedule of other DL transmissions of other UEs. For example, long DL repeated transmissions may occupy an entire channel. Thus, the timing of the compensation gap after DL transmissions may be adjusted for other UE transmissions.

The compensation gap may be employed to transmit the control information. The BS may transmit the control information such that the control information may be received by the UE. In some embodiments, the BS may determine the time to transmit the control information not earlier than a time-domain length before the beginning of the compensation gap, and not later than the time-domain length before the end of the compensation gap. In some embodiments, the time-domain length may be based on one or more propagation delays. In other words, the BS may consider propagation delays when determining when to transmit the control information.

In some embodiments, a timing may be determined to transmit the control information, the timing of the determining beginning after the start of the compensation gap. The determination of the timing to transmit the control information may be based on the BS's reception of data and preparing of the transmission of data. The determination of the timing to transmit the control information may be one or more symbols, slots, or subframes.

Figure 5:
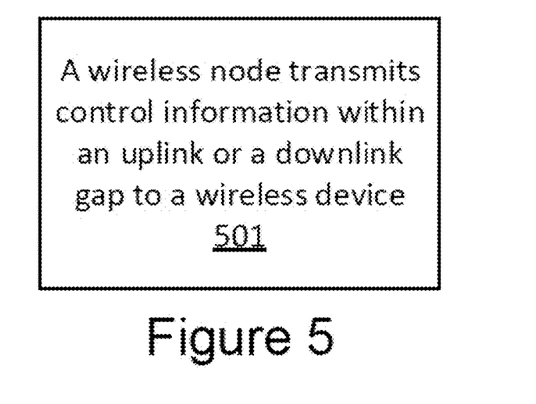
FIG. 5 illustrates a flow chart of an example method of a base station transmitting control information to a user equipment, in accordance with some embodiments of the present disclosure.

FIG. 5 illustrates a flow chart of an example method of a BS transmitting control information to a UE. As described in 501, a BS may transmit control information in a UL or DL gap to a UE. The control information may adjust the repeated transmission schedule and may include information related to beam switching information, a number of missed repeated transmissions, or termination information, as discussed herein.

Figure 6:
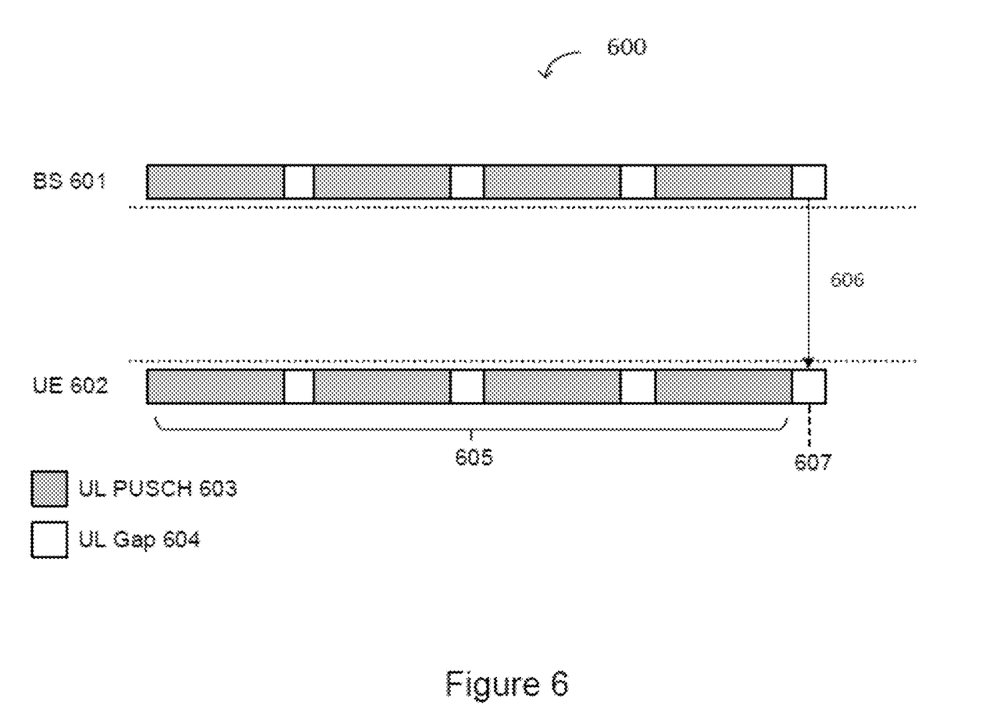
FIG. 6 illustrates an example system signaling termination of scheduled transmissions in the time domain, in accordance with some embodiments of the present disclosure.

FIG. 6 illustrates an example system 600 signaling termination of scheduled transmissions in the time domain, according to some embodiments. The system 600 may include a BS 601 and a UE 602 transmitting and receiving in the time domain. The UE 602 may transmit, for example UL PUSCH 603 during designated time slots. A number n may be the scheduled number of repeated transmissions that the UE 602 is scheduled to transmit UL PUSCH 603. Thus, UL PUSCH 603 may be repeated n times, where each UL PUSCH 603 other than the first UL PUSCH 603, may be preceded by a compensation gap 604. In one example, after four transmissions 605, where 4<n, the BS 601 may successfully decode the UL PUSCH 603. Upon successfully decoding the UL PUSCH 603, the UE 602 may not need to repeat the UL PUSCH 603 transmissions. Thus, the BS 601 may insert termination information 606 during the compensation gap 604 to be received at UL Gap 607. The termination information may be transmitted after the BS 601 decodes the UL PUSCH 603. Thus, UE 602 may preserve power and efficiency by terminating the UL PUSCH 603 repeated transmissions before the originally scheduled n times.

Figure 7:
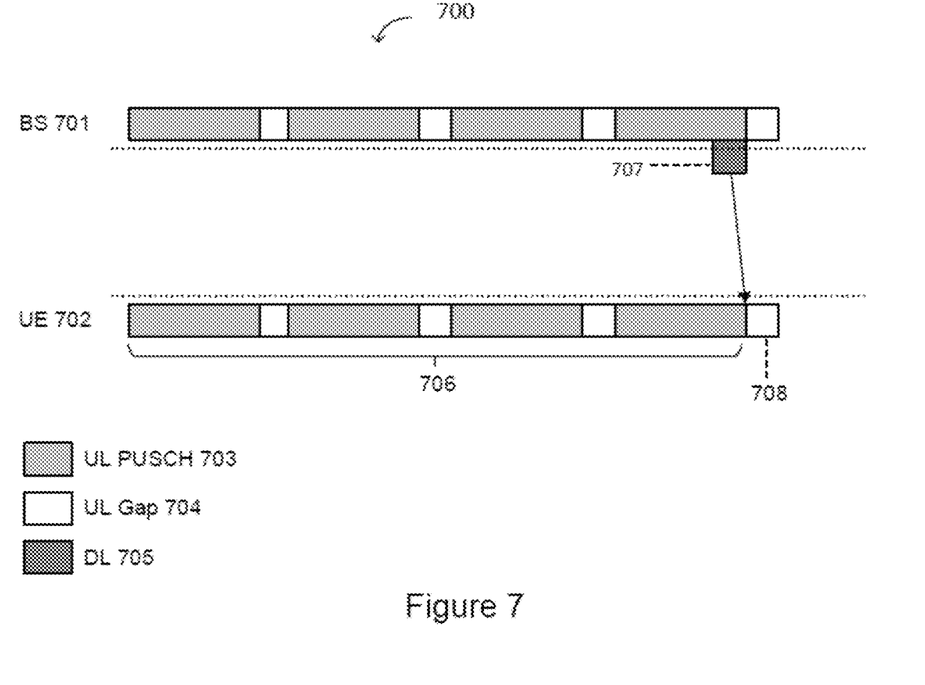
FIG. 7 illustrates an example system signaling termination of scheduled transmissions in the frequency domain, in accordance with some embodiments of the present disclosure.

FIG. 7 illustrates an example system 700 signaling termination of scheduled transmissions in the frequency domain duplex system, according to some embodiments. The system 700 may include a BS 701 and a UE 702 transmitting and receiving in DL subframe and UL gap. The UE 702 may transmit, for example, UL PUSCH 703 on a certain UL frequency band. A number n may be the scheduled number of repeated transmissions that UE 702 is scheduled to transmit UL PUSCH 703. Thus, UL PUSCH 703 may be repeated n times, where each UL PUSCH 703 other than the first UL PUSCH 703 may be preceded by a compensation gap 704. In one example, after four transmissions 706, where 4<n, the BS 701 may successfully decode the UL PUSCH 703. Upon successfully decoding the UL PUSCH 703, the UE 702 may not need to repeat the UL PUSCH 703 transmissions. Thus, the BS 701 may process and prepare termination information 707. The processing and preparing of the termination information may be performed such that the termination information may be transmitted and received by UE 702 during the next UL Gap 704, specifically UL Gap 708. The termination information 707 may be processed and prepared after the BS 701 decodes the UL PUSCH 703. Thus, UE 702 may preserve power and efficiency by terminating the UL PUSCH 703 repeated transmissions before the originally scheduled n times.

In some embodiments, a second compensation gap may occur after the first compensation gap. As discussed herein, the compensation gap may be adjusted for DL transmissions. In other words, the timing of the compensation gap after DL transmissions may be adjusted for other UE transmissions. Thus, the second compensation gap may be adjusted for other UE transmission when implemented for DL transmissions.

Control information may be transmitted or received during the first compensation gap or second compensation gap. The first compensation gap and second compensation gap may have different beginning times. In other words, there may be a first UL gap and a second UL gap, where the first and second UL gaps have different beginning times. Further, there may be a first DL gap and a second DL gap, where the first and second DL gaps have different beginning times. In some embodiments, the second compensation gap may be inserted between two first compensation gaps. For example, if the period of the first compensation gaps is 256 ms, a first compensation gap may be at 0 ms and 256 ms. The second compensation gap may be inserted at 128 ms. In some embodiments, the second compensation gap may be the same length of time as the first compensation gap. In some embodiments, the second compensation gap may be 40 ms long. In other embodiments, the second compensation gap may be a fraction of the length of time of the first compensation gap.

In some embodiments, the second compensation gap may be inserted by the BS after a round trip time. The round trip time may be the time for a transmission from the BS to reach the UE and a subsequent transmission from a UE to reach the BS. In some embodiments, the BS may insert an additional gap between the first and second compensation gaps based on a fixed time offset.

In some embodiments, the additional compensation gap can be appended to a first and/or second compensation gap such that the duration of the compensation gap is extended. In other words, a UL gap may be appended by an additional UL gap. Further, a DL gap may be appended by an additional DL gap. As discussed herein, the compensation gap may be adjusted for DL transmissions. In other words, the timing of the compensation gap after DL transmissions may be adjusted for other UE transmissions. Thus, the additional compensation gap may be adjusted when implemented for DL transmissions to consider other UE transmissions.

This compensation gap with an appended compensation gap may be called an extended compensation gap. The extension of the compensation gap, whether a UL compensation gap or DL compensation gap, may be based on comparing a plurality of propagation delays. The extended compensation gap may be a UL or DL gap in the time domain. In some embodiments, a BS may configure a plurality of UL or DL extended gaps in the time domain. An extended compensation gap may increase the likelihood that the UE receive the BS transmission within the compensation gap. An extended compensation gap may increase the overhead of the compensation gap.

In some embodiments, a first UL gap and a second UL gap may be inserted into a single UL gap such that at least one of PUSCH, PUCCH, or PRACH transmission is postponed.

Figure 8:
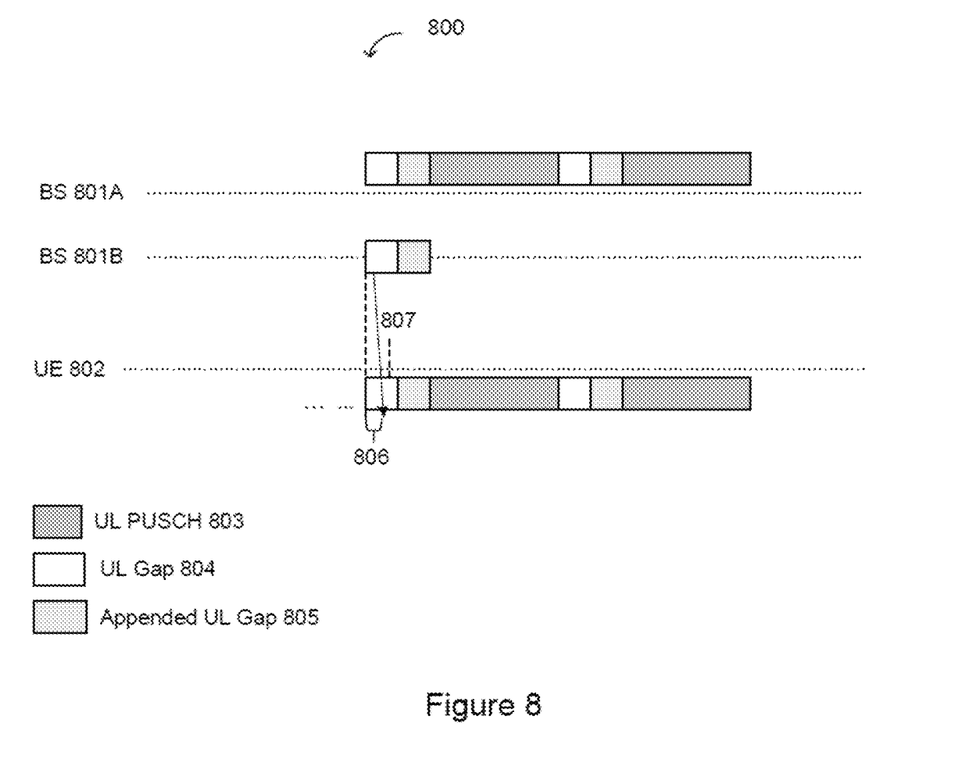
FIG. 8 illustrates an example system transmitting an adjustment to the repeated transmission in the frequency domain using an appended compensation gap, in accordance with some embodiments of the present disclosure.

FIG. 8 illustrates an example system 800 transmitting an adjustment to the repeated transmission in the frequency domain using an appended compensation gap, according to some embodiments. The system 800 may include a UE 802 and BS 801A-B that can both receive and transmit, where the receiver side BS 801A and the transmitter side BS 801B do not operate simultaneously.

In some embodiments, the adjustment to the repeated transmission may include adjusting the repeated transmission such that BS 801 indicates beam switching is to occur. In some embodiments, BS 801B may transmit a flag in the control field that indicates beam switching is occurring. In other embodiments, BS 801B may transmit a new beam source, indicating that beam switching is occurring. In response to BS 801 determining that beam switching should occur, BS 801B may deliver the beam switch information such that the UE 802 receives the beam switch information in the closest compensation gap after BS 801 makes the beam switch determination. For example, BS 801 may make a determination to beam switch when a UE moves out of the first beam coverage or the receiver power of a UL signal in a first beam is smaller than the receiver power of a UL signal in a second beam, BS 801 may determine that a beam switch is appropriate and prepare the control information before UL Gap 804 such that BS 801B is ready to transmit the adjusted control information during UL Gap 804, specifically at UL Gap 807. The propagation delay 806 may be the time between BS 801B transmitting the control information, the control information containing the beam switch information, and UE 802 receiving the control information at UL Gap 807. Appended UL Gap 805 may be inserted such that UE 802 shall receive the control information within the UL Gap, has time to process the received control information, and adjust for the next UL PUSCH 803 transmission.

Figure 9:
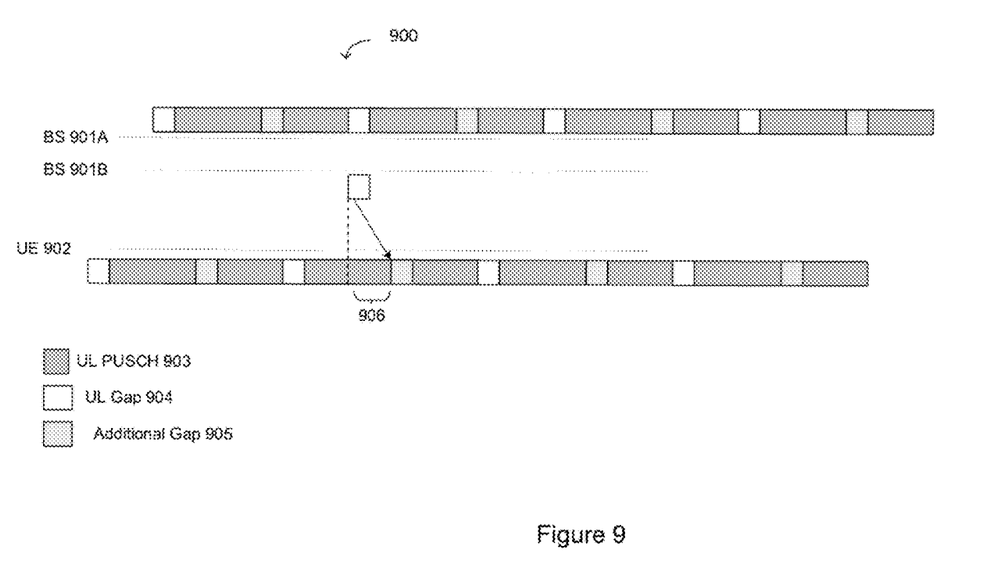
FIG. 9 illustrates an example system transmitting an adjustment to the repeated transmission in the frequency domain using additional compensation gaps, in accordance with some embodiments of the present disclosure.

FIG. 9 illustrates an example system 900 transmitting an adjustment to the repeated transmission using additional compensation gaps, according to some embodiments. The system 900 may include a UE 902 and BS 901A-B that can both receive and transmit, where the receiver side BS 902A and the transmitter side 902B do not operate simultaneously.

In some embodiments, the adjustment to the repeated transmission may include adjusting the repeated transmission such that BS 901 indicates beam switching is to occur. In some embodiments, BS 901B may transmit a flag in the control field that indicates beam switching is occurring. In other embodiments, BS 901B may transmit a new beam source, indicating that beam switching is occurring. In response to BS 901 determining that beam switching should occur, BS 901B may transmit the beam switch information such that the UE 902 receives the beam switching information in the closest compensation gap after BS 901 makes the beam switch determination. BS 901 may determine that a beam switch is appropriate and prepare the control information such that BS 801B is ready to transmit the adjusted control information during a UL Gap. In some embodiments, for example, when the propagation delay 906 is long, an Additional Gap 905 may be inserted in between UL Gaps 904. The Additional Gap 905 allows UE 902 to receive information from BS 901B when there are long propagation delays. Thus BS 901B may transmit information to UE 902 during UL Gap 904 or Additional Gap 905.

Figure 10:
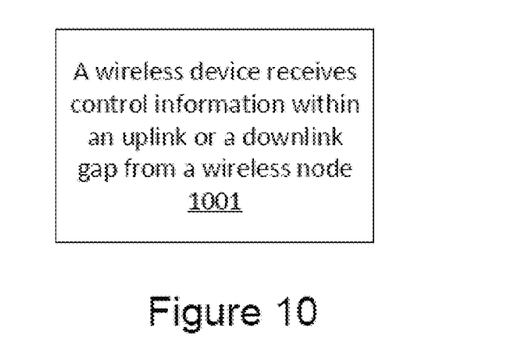
FIG. 10 illustrates a flow chart of an example method of user equipment receiving control information from a base station, in accordance with some embodiments of the present disclosure.

After a BS transmits the control information, a UE may receive the control information in a compensation gap. FIG. 10 illustrates a flow chart of an example method of a UE receiving control information from a BS. As described in 1001, a UE may receive control information in a UL or DL gap from a BS. The control information may adjust the repeated transmission schedule and may include beam switching information, a number of missed repeated transmissions, or termination information, as discussed herein.

Figure 11:
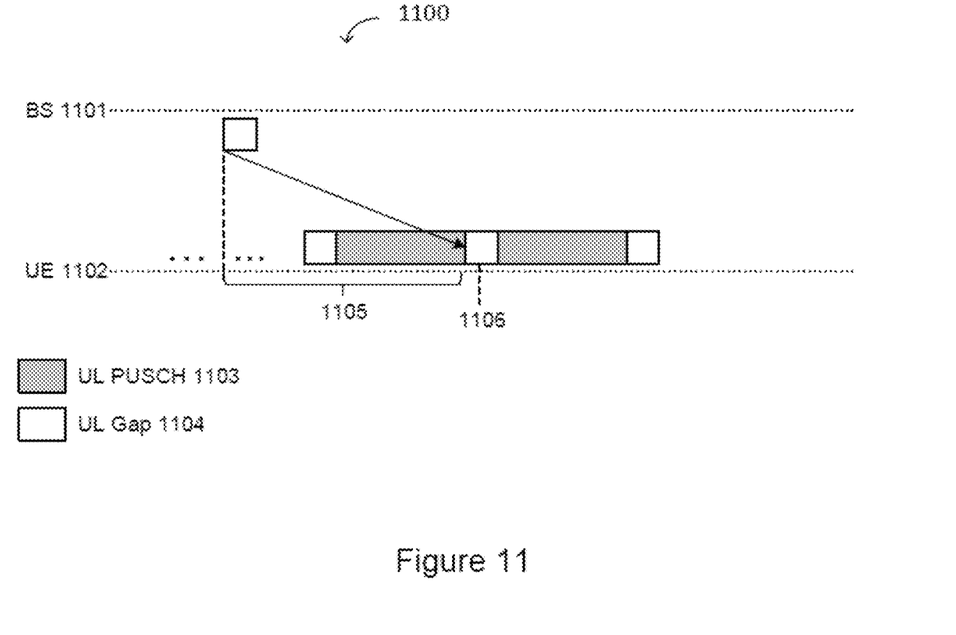
FIG. 11 illustrates an example system receiving a control signal, in accordance with some embodiments of the present disclosure.

FIG. 11 illustrates an example system 1100 receiving a control signal, according to some embodiments. The system 1100 may include a BS 1101 and a UE 1102 transmitting and receiving in the time domain. The UE 1102 may receive, for example, a transmitted control signal at a UL gap 1104 indicated by 1106. The control signal may be received at 1106, which may be one propagation delay 1105 after the control signal was transmitted by BS 1101.

A UE may receive control information from a BS. The control information may be received in a UL or DL compensation gap. As discussed herein, the compensation gap may be adjusted for DL communication. In other words, the timing of the compensation gap after DL reception may be adjusted for other UE transmissions.

In some embodiments, control information received in compensation gaps may adjust repeated transmission schedules by including beam switching information, a number of missed repeated transmissions, or termination information. In some embodiments, the UE may receive information about DL transmission in a UL compensation gap. In some embodiments, the control information may be received after the start of the compensation gap. In some embodiments, the control information may be received during one or more of: symbols, slots, subframes or frames. In some embodiments, the control information may be received after one or more propagation delays. In some embodiments, the UE may need to process the control information. In alternate embodiments, the UE may need to process the repeated transmission information. The UE may process the control information and/or the repeated transmission information by resource demapping, demodulations, and/or descrambling.

In some embodiments, a transmission may not be completely received in one service beam because of the BS's movement and long propagation delays. Subsequently, a UE may need to continue receiving the transmission at a different service beam. In other words, the UE may determine to switch from a first resource to a second, different resource. In some embodiments, the UE may determine to switch resources based on the determination that the transmission is not complete. In other embodiments, the UE may determine to switch resources based on the control information received. In the event that another beam is to be employed for a next repeated DL transmission, a UE may receive beam switching information. In other words, the UE may track the BS's beam switch from a first resource to a second, different resource based on the received control information. In some embodiments, the information indicating that the beam may be switched may be received in the form of a 1 bit flag in a control field in the transmitted signal. In other embodiments, the information indicating that the beam may be switched may be received by indicating a second beam that is being switched to.

In some embodiments, in response to the beam switch, data may not be successfully transmitted to the BS. In some embodiments, the UE may receive control information indicating a certain number of missed data, for example missed PUSCH. In some embodiments, the missed data may be caused by the BS determining that a beam switching is to occur. In response to the UE receiving information indicating that data has been missed, the UE may determine a number of repeated transmissions such that the information missed by the BS is communicated to the BS. The UE may determine the number of repeated transmissions based on an initially configured value, signaling, and/or propagation delays. In some embodiments, if information was missed by the BS because the BS was determining to switch beams, the UE may transmit the missed data to the newly scheduled beam.

In some embodiments, in response to the BS successfully decoding the transmitted data, the subsequent repeated transmissions may not be necessary. For example, a transmission may generally be repeated n times. In response to the BS successfully decoding PUSCH, PRACH and/or PUCCH in x transmissions, where x<n, the remaining n−x transmissions may not be transmitted by the UE. In other words, the UE may be notified, via received termination information from the BS, that the UE may stop transmitting a portion of the scheduled repeated transmissions. For example, the UE may stop transmitting the remaining scheduled repeated transmissions. The UE's system efficiency and power may be improved by not transmitting the remainder of the n−x transmissions. In some embodiments, the termination information may be received in the form of a 1 bit flag in a control field in the transmitted signal.

3. User Equipment Transmits Control Information

DL and UL transmission between satellites and users can be very lengthy because there may be a need to repeat the transmission various times. In some embodiments, a UE may transmit control information in an UL or DL compensation gap such that the repeated transmission schedule may be adjusted. In some embodiments, repeated transmission schedules may be adjusted by control information where the control information includes beam switching information or termination information.

Figure 12:
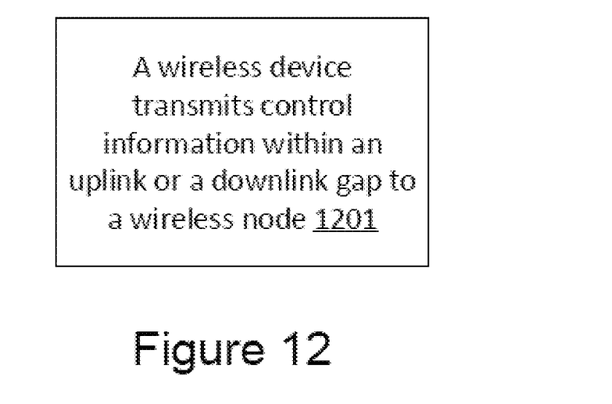
FIG. 12 illustrates a flow chart of an example method of a user equipment transmitting control information to a base station, in accordance with some embodiments of the present disclosure.

FIG. 12 illustrates a flow chart of an example method of a UE transmitting control information to a BS. As described in 1201, a UE may transmit control information in a UL or UL gap to a BS. The control information may adjust the repeated transmission schedule and may include information related to beam switching information and termination information, as discussed herein.

In some embodiments, a transmission may not completely end in one service beam because of the BS's movements and long propagation delays. In some embodiments, it may be advantageous to continue transmitting in a different service beam. As discussed herein, transmissions may be interrupted by compensation gaps for timing and/or frequency resynchronization. Generally, the frequency resource of each beam of a satellite and/or BS is pre-allocated. The pre-allocated beam resource may be based on a reference signal.

In some embodiments, a UE may determine that beam switching should occur based on measurements of a reference signal. In other words, transmissions scheduled to occur via certain beams may be adjusted. For example, the UE may determine to switch beams from beam 1 to beam 2 during a scheduled repeated transmission. In other words, a UE transmitting PUSCH on beam 1, that is scheduled to repeat the transmission of PUSCH on beam 1, may switch beams and subsequently transmit PUSCH on beam 2. In some embodiments, the UE processes beam switching within a compensation gap and may begin transmitting the repeat transmission after the last symbol of the compensation gap.

The UE may determine to switch beams if the resources on the new beam are suitable for transmission. For example, if the resources in beam 2 are available, the UE may determine to switch to beam 2. In other words, the UE may transmit switching information indicative of switching from a first resource to a second, different resource. For example, the UE may transmit switching information in the form of a raised beam switch flag.

In some embodiments, resources of a single beam may be shared by UEs. In one example, a first UE may be transmitting to a BS via a beam. A BS may determine that the first UE was switched in response to the BS receiving beam information from a second UE. The BS may allocate the resources from the first UE to a second UE and stop transmission with the first UE.

The UE that determines that beam switching should occur may transmit the beam switching information in a switching compensation gap. The switching compensation gap may have a duration of one or more symbols, slots or subframes. In some embodiments, the switching compensation gap may consume resources of the scheduled UL compensation gap. For example, the switching compensation gap may occur at the end of a scheduled UL compensation gap. Alternatively, the switching compensation gap may occur at the beginning of a scheduled UL compensation gap. Further, the switching compensation gap may denote one or more time-domain resources, such as slots or symbols, which may be used as a feedback transmission from the BS.

The BS may pre-assign dedicated resources for use in transmission to a UE during the feedback transmission in response to the switching compensation gap. The BS may determine the pre-assigned resources based on UE reports of the quality of neighboring beams.

In alternate embodiments, the information provided to the BS may be limited. For example, the UE may not provide the BS with an indication of beam switching. For example, a BS may not indicate beam switching by raising a flag in the control field. Further, a UE may not indicate the number of missed repeated transmissions, the missed repeated transmissions caused by the beam switching.

The BS may expect the UE to transmit repeated transmissions, for example PUSCH repetitions, during the scheduled transmission times. In the event the UE beam switches and does not transmit beam switching information or a number of missed repeated transmissions, the BS may fail to detect the scheduled transmission at the scheduled service beam. In some embodiments, in response to failing to detect the scheduled transmission at the scheduled service beam, the BS may blindly detect and/or search other beams for the scheduled transmissions. In the event that the BS searches for the repeated transmissions, the BS may tolerate some loss of the repeated transmissions while the BS is searching for the repeated transmissions on different beam resources.

In some embodiments, a UE may successfully decode the DL transmission before the transmission has repeated the scheduled n number of times. For example, the UE may successfully decode Physical Downlink Shared Channel ("PDSCH") in x transmissions, where x<n. The UE may determine to stop the scheduled transmissions early, for example, after x transmissions. Thus, the remaining n--x scheduled transmissions may be terminated. Thus, the UE may transmit termination information indicative of terminating a portion of the scheduled repeated transmissions. For example, a first UE may transmit termination information and then begin waiting for feedback or acknowledgement from the BS. The first UE may signal to the BS via the termination information that the BS may stop current transmission and subsequent repeated transmissions. In response to receiving the termination information and transmitting the acknowledgement to the first UE, the BS may schedule the first UE or a second UE. In another example, a UE may transmit termination information indicative of terminating the remaining scheduled repeated transmissions. Terminating the remaining scheduled transmissions may improve system efficiency and save power. The termination signal may be transmitted from the BS to the UE in a pre-allocated DL compensation gap. The pre-allocated DL compensation gap may replace a duration of the compensation gap. For example, the pre-allocated DL compensation gap may be transmitted for several symbols, slots, or subframes at the beginning or end of the compensation gap.

In other embodiments, a termination signal may not be transmitted. Instead, during the remaining n−x scheduled transmissions, the UE may not transmit anything.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A wireless communication method, comprising:
   transmitting, by a wireless communication node to a wireless communication device, within a compensation gap comprising an uplink gap or a downlink gap, control information, the compensation gap inserted by the wireless communication device between uplink or downlink transmissions with the wireless communication node,
   wherein the wireless communication node determines a timing for transmission of the control information to the wireless communication device, the timing determined according to the compensation gap and one or more propagation delays.

2. The wireless communication method of claim 1, wherein
   the control information corresponds to a change of configuration in repetition transmissions, and wherein the control information includes at least one of: switching information, a number of missed repetition transmissions, or termination information.

3. The wireless communication method of claim 2, wherein the termination information is indicative of terminating a portion of scheduled repetition transmissions.

4. The wireless communication method of claim 2, wherein the switching information is indicative of switching from a first resource to a second resource that is different from the first resource.

5. The wireless communication method of claim 2, further comprising determining, by the wireless communication node, to switch from the first resource to a second resource that is different from the first resource.

6. The wireless communication method of claim 1, further comprising determining, by the wireless communication node, the timing to transmit the control information, wherein the timing starts during a period of time after a beginning time of the uplink gap or the downlink gap.

7. The wireless communication method of claim 6, wherein the period of time corresponds to a time during which the wireless communication node processes received data information and prepares transmission, and wherein the period of time includes one or more of: symbols, slots, or subframes.

8. The wireless communication method of claim 1, further comprising determining, by the wireless communication node, the timing to transmit the control information, wherein the timing is not earlier than a time-domain length prior to a beginning time of the uplink gap or the downlink gap, and not later than the time-domain length prior to an ending time of the uplink gap or the downlink gap.

9. The wireless communication method of claim 1, further comprising configuring, by the wireless communication node, an extended uplink gap or downlink gap in time-domain.

10. The wireless communication method of claim 1, further comprising configuring, by the wireless communication node, a plurality of extended uplink gaps or a plurality of extended downlink gaps in time-domain.

11. The wireless communication method of claim 8, further comprising determining, by the wireless communication node, the time-domain length based on a plurality of propagation delays.

12. The wireless communication method of claim 1, wherein the uplink gap includes a first uplink gap and a second uplink gap, and wherein the first uplink gap and the second uplink gap have respective different beginning times.

13. The wireless communication method of claim 1, wherein the downlink gap includes a first downlink gap and a second downlink gap, and wherein the first downlink gap and the second downlink gap have respective different beginning times.

14. The wireless communication method of claim 12, further comprising determining, by the wireless communication node, a gap between the first uplink gap and the second uplink gap based on a fixed time offset.

15. The wireless communication method of claim 13, further comprising determining, by the wireless communication node, a gap between the first downlink gap and the second downlink gap based on a fixed time offset.

16. The wireless communication method of claim 1, wherein the control information transmitted within the uplink gap or the downlink gap includes at least one of: broadcasting information, synchronization information, or reference signal information.

17. A wireless communication method, comprising:
    receiving, by a wireless communication device from a wireless communication node, within a compensation gap comprising an uplink gap or a downlink gap, control information, the compensation gap inserted by the wireless communication device between uplink or downlink transmissions with the wireless communication node,
    wherein the control information is received responsive to the wireless communication node transmitting the control information according to a timing determined by the wireless communication node, the timing determined according to the compensation gap and one or more propagation delays.

18. A wireless communication node, comprising:
    at least one processor configured to:
    transmit, via a transmitter to a wireless communication device, within a compensation gap comprising an uplink gap or a downlink gap, control information, the compensation gap inserted by the wireless communication device between uplink or downlink transmissions with the wireless communication node,
    wherein the wireless communication node determines a timing for transmission of the control information to the wireless communication device, the timing determined according to the compensation gap and one or more propagation delays.

19. A wireless communication device, comprising:
    at least one processor configured to:
    receive, via a receiver from a wireless communication node, within a compensation gap comprising an uplink gap or a downlink gap, control information, the compensation gap inserted by the wireless communication device between uplink or downlink transmissions with the wireless communication node,
    wherein the control information is received responsive to the wireless communication node transmitting the control information according to a timing determined by the wireless communication node, the timing determined according to the compensation gap and one or more propagation delays.

* * * * *